(12) United States Patent
Gitt

(10) Patent No.: US 7,798,937 B2
(45) Date of Patent: Sep. 21, 2010

(54) TRANSMISSION WITH A COUNTERSHAFT WHICH CAN BE IDLED IN DIRECT GEAR

(75) Inventor: Carsten Gitt, Stuttgart (DE)

(73) Assignee: Daimler AG, Stuttgart (DE)

( * ) Notice: Subject to any disclaimer, the term of this patent is extended or adjusted under 35 U.S.C. 154(b) by 424 days.

(21) Appl. No.: 11/982,740

(22) Filed: Nov. 2, 2007

(65) Prior Publication Data

US 2008/0127758 A1 Jun. 5, 2008

Related U.S. Application Data

(63) Continuation-in-part of application No. PCT/EP2006/003804, filed on Apr. 25, 2006.

(30) Foreign Application Priority Data

May 3, 2005 (DE) ....................... 10 2005 020 606

(51) Int. Cl.
*F16H 3/44* (2006.01)

(52) U.S. Cl. ...................... 475/302; 475/207; 475/218; 475/343; 74/329; 74/331

(58) Field of Classification Search .................. 475/207, 475/209, 218, 302, 303, 343; 74/325, 329, 74/331
See application file for complete search history.

(56) References Cited

U.S. PATENT DOCUMENTS 5,351,569 A 10/1994 Trick et al.
5,381,703 A 1/1995 Rankin
5,416,698 A * 5/1995 Hutchison ..................... 701/51
5,791,189 A * 8/1998 Newbigging ................. 74/335

FOREIGN PATENT DOCUMENTS

| DE | 923 402 | 12/1955 |
| DE | 42 26 575 | 9/1993 |
| DE | 102 24 064 | 12/2003 |
| DE | 102 39 396 | 3/2004 |
| EP | 1 279 862 | 1/2003 |
| GB | 358 462 | 4/1930 |
| GB | 2 103 317 | 2/1983 |

* cited by examiner

*Primary Examiner*—David D Le
(74) *Attorney, Agent, or Firm*—Klaus J. Bach

(57) ABSTRACT

In a utility vehicle transmission having an input shaft, a main shaft and an output shaft, a countershaft is provided which can be decoupled in direct gear, a high number of gears wherein power is transmitted from the input shaft to the output shaft directly via the main shaft while providing for a high number of gears by two shiftable input constants with different transmission ratios which are selectively engageable with either of the various forward transmission stages and the reverse transmission stage but which also permit the return flow of power from the input shaft to the main shaft via the input constants.

7 Claims, 2 Drawing Sheets

TRANSMISSION WITH A COUNTERSHAFT WHICH CAN BE IDLED IN DIRECT GEAR

This is a Continuation-In-Part Application of pending international patent application PCT/EP2006/003804 filed Apr. 25, 2006 and claiming the priority of German patent application 10 2005 020 606.9 filed May 3, 2005.

BACKGROUND OF THE INVENTION

The invention relates to a transmission with a countershaft which can be idled in direct gear.

DE 102 39 396 A1 also relates to a countershaft transmission having a direct gear, wherein countershaft does not rotate when the direct gear is engaged.

Furthermore, U.S. Pat. No. 5,381,703 relates to a countershaft transmission having an input shaft, an output shaft and a countershaft, wherein the drive of the countershaft is idled when the transmission is in the direct gear.

It is the principal object of the present invention to provide a transmission for utility vehicles which, while being of compact design, has a high level of efficiency.

SUMMARY OF THE INVENTION

In a utility vehicle transmission having an input shaft, a main shaft and an output shaft, a countershaft is provided which can be decoupled in direct gear, a high number of gears wherein power is transmitted from the input shaft to the output shaft directly via the main shaft while providing for a high number of gears by two shiftable input constants with different transmission ratios which are selectively engageable with either of the various forward transmission stages and the reverse transmission stage but which also permit the return flow of power from the input shaft to the main shaft via the input constants.

The invention particularly advantageously makes a high number of transmission gears possible since two input constants double the number of gears which are formed by the remaining gearwheel pairings. The two input constants are additionally utilized to form together one forward gear. Here, the force flow can extend from the one input constant via the countershaft to the other input constant and subsequently to a main shaft. The main shaft can be coupled without a transmission stage to the input shaft, so that a direct gear is formed. The main shaft can, in a particularly advantageous embodiment, be adjoined by a range group which can have two shift states, so that
the forward gear via the two input constants,
and also the direct gear,
and also the reverse gear,
and also forward gears which run via only one input constant and a further transmission stage, can form in each case two different gears, so that the total number of gears is doubled. Here, the range group can particularly advantageously be embodied as a planetary gear set, which
provides a step-down transmission ratio in the one shift state, and
rotates as a block in the other shift state, so that the main shaft rotational speed is transmitted unchanged to an axle gearing.

The design of the planetary gear set in connection with a corresponding design
of the transmission ratios in the countershaft transmission and
of the transmission ratio at the rear axle gearing makes it possible to place the most-utilized driving range of a utility vehicle at approximately 80 kilometers per hour in a direct through drive. In said direct through drive,
the direct gear is engaged,
the planetary gear set of the range group rotates in a block and
the countershaft is decoupled, that is, idled.

The efficiency of the transmission for utility vehicles is therefore kept very high in the most-utilized driving range for long distance routes. Here, the transmission ratio can be designed such that the engine operates in the most fuel-efficient speed range. The most fuel-efficient engine speed range is, for example in the case of 6-cylinder diesel engines, between 1100 and 1500 rev/min or RPM. Here, the most fuel-efficient engine speed lies more toward 1100 RPM for high-volume displacement 6-cylinder diesel engines, and more toward 1500 rev/min or RPM for low-displacement volume 6-cylinder diesel engines.

The design of the planetary gear set with a step-down transmission ratio or a direct through drive—that is to say without a step-up transmission ratio—makes it possible to configure the rotational speeds in the countershaft transmission to be high and the torque to be low, so that relatively low forces occur in the countershaft transmission. It is therefore possible
to dimension the gearwheels to be narrow and
to dimension the transmission housing with thin walls.

The countershaft transmission can particularly advantageously be embodied as a coaxial transmission which is used in a particularly advantageous way with engines which are installed longitudinally in the vehicle. In a coaxial countershaft transmission of this type, the input shaft and main shaft are aligned with one another. The planetary gear set, which adjoins the countershaft transmission in an advantageous embodiment, can likewise be arranged coaxially here.

The invention makes possible, despite the possibility of idling the countershaft, and with a small installation space, to provide a high number of gears—in particular forward gears—without the need for
a second countershaft or
a hollow shaft which extends over a plurality of gearwheel planes coaxially with respect to the countershaft of one of the main shafts.

In a particularly advantageous embodiment of the invention, the direct drive shaft to the main shaft, despite the use of a range group which is connected downstream of the main shaft in the power flow, the main shaft is supported at the transmission end.

The invention will become more readily apparent from the following description of two schematically illustrated exemplary embodiments of the overall motor vehicle drive train.

DESCRIPTION OF PARTICULAR EMBODIMENTS

Figure 1:
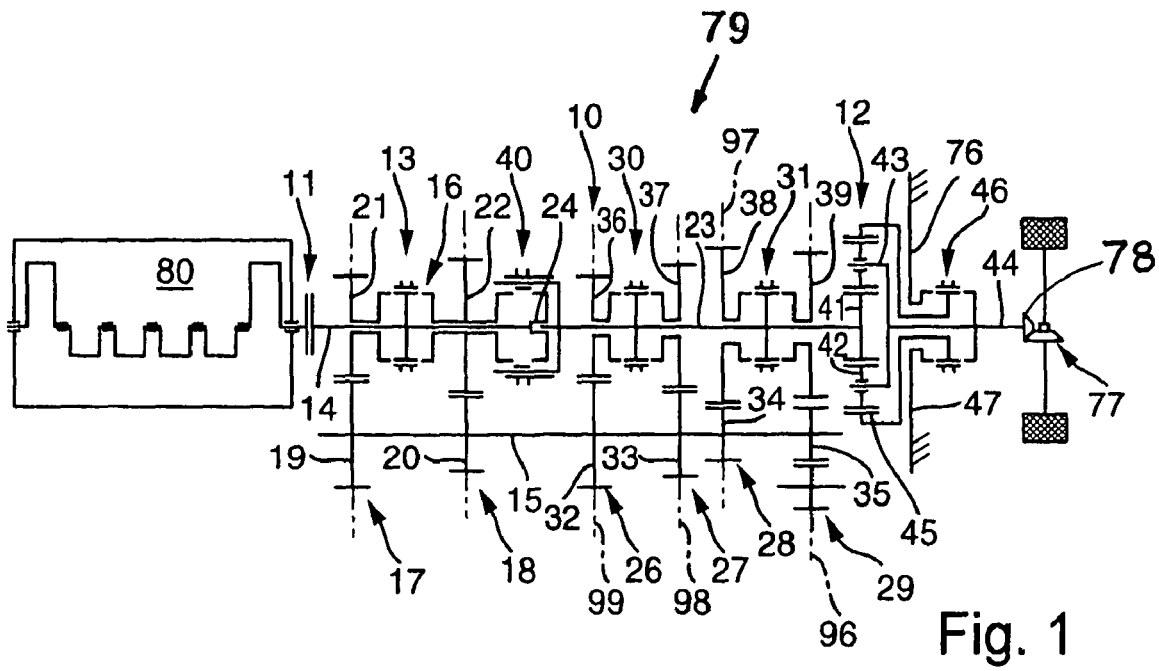
FIG. 1 shows a drivetrain having a utility vehicle transmission with a countershaft transmission and a range group.

FIG. 1 shows a drivetrain including a 6-cylinder diesel engine 80 and a utility vehicle transmission 79 which comprises a countershaft transmission 10 with a range group 12 which adjoins the countershaft transmission 10 both geometrically and in the power flow. The range group 12 is embodied here as a planetary gear set.

A crankshaft of the 6-cylinder diesel engine 80 is adjoined in the force flow by a starting clutch 11 which follows said countershaft transmission 10. Said countershaft transmission 10 has a splitter group 13, so that a 3-group transmission is provided overall. In the splitter gear 13, the drive power is passed from a transmission input shaft 14 to a countershaft 15, with it being possible for the power transmission to take place, depending on the shift state of a shift element 16, via a first input constant 17 or
a second input constant 18 or,
possibly, both input constants 17, 18.

The drive output gearwheels 19, 20 of the input constants 17, 18 are rotationally fixedly connected to the countershaft 15, while the drive input gearwheels 21, 22 of the input constants 17, 18 can be rotationally fixedly connected in each case individually by means of the shift element 16 to the transmission input shaft 14. Here, the shift element 16 is arranged axially between the two drive input gearwheels 21, 22 of the input constants 17, 18.

In addition, the countershaft transmission 10 has, on that side of the splitter group 13 which faces away from the transmission input shaft 14, a main shaft 23 which is mounted in a rolling bearing 24 so as to be rotatable relative to the transmission input shaft 14. The transmission input shaft 14 and the main shaft 23 are arranged so as to be aligned with one another. The countershaft 15 extends parallel to and spaced apart from the main shaft 23. The countershaft 15 and the main shaft 23 can be drive-connected to one another via gearwheel pairs 26, 27, 28 and a reverse gear stage 29 by means of shift elements 30 and 31. Said gearwheel pairs 26, 27, 28 or the reverse gear stage 29 therefore form four gearwheel planes 99, 98, 97, 96 which are assigned in each case both transmission constants 17, 18. Here, the one shift element 30 is arranged axially between the first two gearwheel planes 99, 98, whereas the other shift element is arranged between the other two gearwheel planes 97, 96.

Drive input gearwheels 32, 33, 34, 35 of the gearwheel pairs 26 to 28 and of the reverse gear stage 29 are rotationally fixedly connected to the countershaft 15. Drive output gearwheels 36, 37 of the gearwheel pairs 26, 27 can be connected by means of the shift element 30 in each case individually to the main shaft 23, while drive output gearwheels 38, 39 of the gearwheel pair 28 and of the reverse gear stage 29 can be connected in each case individually by means of the shift element 31 to the main shaft 23.

In a first shift state, the shift element 16 connects the drive input gearwheel 21 to the transmission input shaft 14. In the neutral state illustrated in FIG. 1, the shift element 16 is decoupled, so that the drive input gearwheels 21, 22 are in each case freely rotatable relative to one another and relative to the transmission input shaft 14. In a second shift state, the shift element 16 connects the drive input gearwheel 22 to the transmission input shaft 14.

In a first shift state, the shift element 30 connects the drive output gearwheel 36 to the main shaft 23. In the neutral state of the shift element 30 illustrated in FIG. 1, the drive output gearwheels 36, 37 are freely rotatable relative to one another and relative to the main shaft 23. In a second shift state, the main shaft 23 is rotationally fixedly connected to the drive output gearwheel 37 by means of the shift element 30.

In a first shift state, the shift element 31 rotationally fixedly connects the drive output gearwheel 38 to the main shaft 23. In the neutral state of the shift element 31 illustrated in FIG. 1, the drive output gearwheels 38, 39 are rotatable relative to one another and relative to the main shaft 23. In a second shift state, the shift element 31 rotationally fixedly connects the drive output gearwheel 39 to the main shaft 23.

A shift element 40 can be moved into three positions. In the central neutral position illustrated in FIG. 1, the transmission input shaft 14,
the main shaft 23 and
the drive input gearwheel 22 which is embodied as a loose wheel are freely rotatable relative to one another if the shift element 16 does not, in the said second shift state, connect the drive input gearwheel 22 to the transmission input shaft 14.

Figure 2:
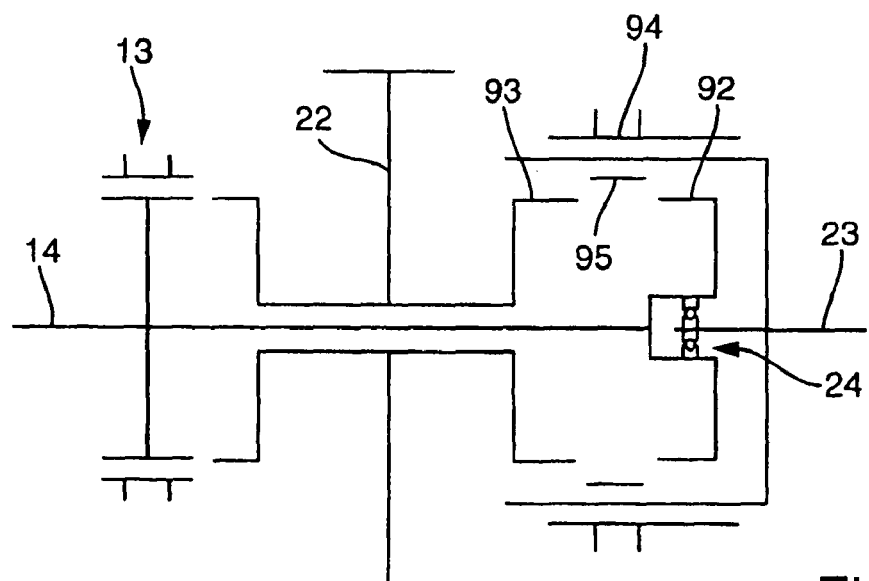
FIG. 2 shows a detail from FIG. 1.

If a sliding sleeve 94, which can be seen in detail in FIG. 2, of the shift element 40 is pushed in the direction of the transmission end or of the range group 12 to such an extent that a shift toothing 95, which is arranged so as to be fixed in terms of movement radially on the inside of the sliding sleeve 94, engages a corresponding shift toothing 92 of the transmission input shaft 14, then a rotationally fixed connection is produced between the main shaft 23 and the transmission input shaft 14. The direct gear is accordingly engaged in the countershaft transmission 10 in such a way that the countershaft 15 is not driven by means of a gearwheel pairing. A slight drive, which is negligible for the overall efficiency of the utility vehicle transmission, of the countershaft 15 takes place in the direct gear in any case on account of the bearing friction of the loose wheels.

If, in contrast, the sliding sleeve 94 of the shift element 40 is pushed in the opposite direction—that is to say in the direction of the drive input gearwheel 22—to such an extent that said shift toothing 95 engages a corresponding shift toothing 93 of the drive input gearwheel 22, then a rotationally fixed connection is produced between the main shaft 23 and the drive output gearwheel 22. If the shift element 16 is now additionally moved into the first shift state, so that the drive input gearwheel 21 is connected to the transmission input shaft 14, then a forward gear is engaged whose force flow runs via the first input constant 17 and the second input constant 18 to the range group 12 and is transmitted from the latter depending on its shift state.

If the shift element 16 is disposed in said first shift state, the input constant 17 can be shifted into power transmission alternatively with a gearwheel pairing 26, 27, 28, 29 of a forward gear or of the reverse gear. If the shift element 16 is in contrast moved into the second shift state, so that the drive input gearwheel 22 is connected to the transmission input shaft 14, then the input constant 18 can be shifted into power transmission alternatively with a gearwheel pairing 26, 27, 28, 29 of a forward gear or of the reverse gear.

The range group 12 has a sun gear 41 which is rotationally fixedly connected to the main shaft 23. The range group 12 also has a plurality of planets 42 which are mounted so as to be rotatable relative to a web 43 which is rotationally fixedly connected to the transmission output shaft 44, and also a ring gear 45.

In a first shift state, the main shaft 23 is rotationally fixedly connected by means of a shift element 46 to the ring gear 45. That is to say, the range group 12 rotates in a block, so that the rotational speed of the main shaft 23 is transmitted unchanged to the transmission output shaft 44. In a central neutral state, the main shaft 23 and the ring gear 45 are not coupled to one another by means of the shift element 46. That is to say, the range group 12 is shifted into neutral and transmits no power to the transmission output shaft 44. In a second shift state, the shift element 46 connects the ring gear 45 to a transmission housing 47, so that the rotational speed of the main shaft 23 is stepped down in the event of a need for an increase in torque.

The transmission output shaft 44 is adjoined by an axle gearing 78 which has a transmission stage 77. Said transmission state is designed such that the 6-cylinder diesel engine 80 has a rotational speed between 1100 and 1500 rev/min or RPM when the direct gear is engaged,
the planetary gear set rotates in a block, and
a vehicle speed is 80 kilometers per hour.

The utility vehicle transmission has sixteen forward gears and four reverse gears. In order to realize six forward gears, each of the two input constants 17, 18 can be followed in the force flow by one of the gearwheel stages 26, 27, 28. In order to realize a further forward gear, the first input constant 17 can be followed by the second input constant 18 as a transmission stage. A further forward gear forms the direct gear. Said total of eight forward gears is adjoined by the range group 12 which on the one hand permits a direct through drive to the transmission output shaft 44 and on the other hand permits a step-down transmission ratio, so that said total of sixteen forward gears is formed. The four reverse gears are generated in that the one reverse gear stage 29 can be combined with the two input constants 17, 18 to form two reverse gears which can be transmitted to the transmission output shaft 44 by means of the range group 12 either directly or alternatively by means of the step-down transmission ratio.

The utility vehicle transmission therefore provides, despite the capacity for decoupling the countershaft 15, for a total of six gearwheel planes in order to realize the above-stated number of gears.

The countershaft transmission 10 has an additional possibility for engaging the direct gear. If the shift element 16 is moved into the second shift state in which it connects the drive input gearwheel 22 to the transmission input shaft 14 and
the shift element 40 is moved in the direction of the drive input gearwheel 22 so that it connects the drive input gearwheel 22 to the main shaft 23, then the direct gear is engaged via the drive input gearwheel 22, but with the countershaft 15 not being decoupled. Said additional shift state with the countershaft 15 coupled can be expedient when it is not desirable for the countershaft 15, which is not involved in the propulsion of the utility vehicle, to be driven. It is for example possible for a brake for a central synchronizer or a transmission oil pump to be connected to the countershaft, the drive of which central synchronizer or transmission oil pump can be desirable in certain operating states including in the direct gear. However, said shift combination with the uninvolved, coupled countershaft 15 can also be excluded by an automated controller, so that said shift state cannot be selected by the driver. It is likewise possible for an automated transmission controller to shift automatically, according to demand, between the direct gear with the countershaft coupled and the direct gear with the countershaft decoupled.

A partition 76 which is fixed to the transmission housing is situated between the planetary gear set of the range group 12 and the shift element 46 of the range group 12. Here, the planetary gear set is situated on that side of the partition 76 which faces towards the countershaft transmission, whereas the shift element 46 is situated on the opposite side.

Figure 3:
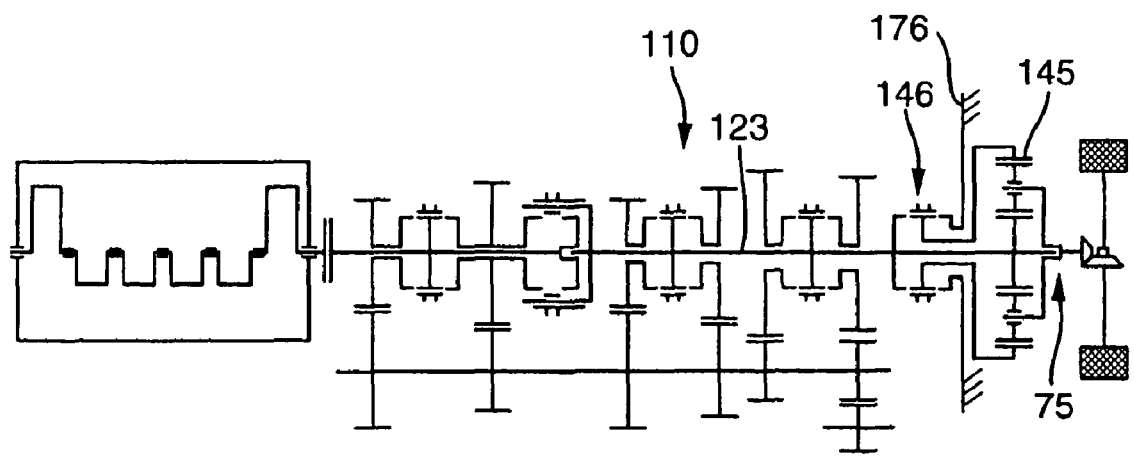
FIG. 3 shows, in a second embodiment, a drive train having a range group which is modified in relation to that of FIG. 1.

FIG. 3 shows, in a second embodiment, a drivetrain having a range group which is modified in relation to FIG. 1. Analogous components are provided with reference numbers which have been increased by 100. In contrast to FIG. 1, the planetary gear set is situated on that side of the partition 176 which faces away from the countershaft transmission 110, whereas the shift element 146 is situated on the opposite side. As a result of the shift element 146 therefore being situated on that side of the partition 176 which faces toward the countershaft transmission 110, the shift element 146 can be designed such that it switches the planetary gear set into a block or into the through drive mode in which it couples the main shaft 123 to the ring gear 145. In this case, the sun gear and the ring gear 145 of the planetary gear set are fixedly connected to one another. As can be seen from FIG. 2, it is possible with this arrangement to move the bearing arrangement 75 of the main shaft 123 up to the transmission end of the utility vehicle transmission 79, resulting in a structural advantage with regard to the bearing loads or bearing dimensions.

The axle gearing illustrated in both exemplary embodiments can be either a rear axle gearing or also the axle gearing of a drive-through axle.

The described embodiments are merely exemplary embodiments. A combination of the described features for different embodiments is likewise possible. Further features, in particular features which have not been described, of the device parts pertaining to the invention can be gathered from the geometries of the device parts illustrated in the drawings.

What is claimed is:

1. A countershaft transmission comprising a transmission input shaft (14) a main shaft (23) in alignment with the input shaft (14), a countershaft (15) which extends in parallel spaced relationship with the main shaft (23) and which can be decoupled when the transmission is in direct gear, and two input constants (17, 18), for the transmission of power from the input shaft (14) to the countershaft (15) and a number of gear sets (32-35) for the transmission of power from the countershaft (15) to the main shaft (23) and an additional forward gear in a force flow from the input shaft (14) back to the main shaft (23) via the two input constants (17, 18), one input constant (18) of the two input constants (17, 18) having a loose wheel (22) which is arranged axially between first and second shift elements (16, 40), whereby, by means of the first shift element (16), a rotationally fixed connection between said loose wheel (22) and the transmission input shaft (14) can be established, and, by means of the second shift element (40), a rotationally fixed connection between said loose wheel (22) and the main shaft (23) can be established.

2. The countershaft transmission as claimed in claim 1, wherein two shift possibilities for the direct gear are provided, of which the one shift possibility permits a decoupling of the countershaft (15), whereas the other shift possibility permits a coupling of the countershaft (15).

3. The countershaft transmission as claimed in claim 1, wherein, with regard to the two input constants (17, 18), said second shift element (40) is assigned exclusively to the one input constant (18), and the direct gear can be engaged with said second shift element (40) in a further position.

4. The countershaft transmission as claimed in claim 3, wherein the two input constants (17, 18) have loose wheels (21, 22) which are arranged coaxially and rotatably on the transmission input shaft (14), whereby, in one shift state of said second shift element (40), a rotationally fixed connection between the main shaft (23) and the transmission input shaft (14) can be established, with said second shift element (40) in said one shift state permitting rotation of the one loose wheel (22) relative to the input shaft (14) when the first shift element (16), which is arranged axially between said loose wheels (21, 22) and can be coupled to either of the loose wheels (21, 22), is uncoupled from the one loose wheel (22).

5. The countershaft transmission as claimed in claim 1, wherein the main shaft (23 or 123) is rotatably supported at an input end with respect to the transmission input shaft (14) by means of a rolling bearing (24).

6. A drivetrain having the countershaft transmission as claimed in claim 5, wherein the main shaft (23) of the countershaft transmission (10) is connected at an output end to a sun gear (41) of a planetary gear set of a range group (12) having a planet carrier (43) which is connected to a transmission output shaft (44) and a ring gear (45) which can be coupled on the one hand to a transmission housing (47) in order to produce a step-down transmission ratio and on the other hand to one of the transmission output shaft (44) and the main shaft (23) in order to provide for a direct through drive.

7. The drivetrain as claimed in patent claim 6, wherein the transmission input shaft (14) is connected by means of a starting element (11) to a drive motor (80), wherein the transmission output shaft (44) is connected to an axle gearing (78) which comprises a transmission stage (77) having a transmission ratio selected such that the engine can be operated in a rotational speed range between 800 and 1500, RPM when a vehicle in which the transmission is installed is operated at 80 kilometers per hour and the direct gear is engaged, and the main shaft (23) and the transmission output shaft (44) are rotationally fixedly coupled to one another by means of the range group (12).

\* \* \* \* \*